(12) United States Patent
Huertos Sanz

(10) Patent No.: US 8,534,112 B2
(45) Date of Patent: Sep. 17, 2013

(54) SUPPORT DEVICE FOR PROBE

(75) Inventor: Rafael Huertos Sanz, Madrid (ES)

(73) Assignee: Eads Construcciones Aeronauticas, SA, Madrid (ES)

( * ) Notice: Subject to any disclaimer, the term of this patent is extended or adjusted under 35 U.S.C. 154(b) by 265 days.

(21) Appl. No.: 12/928,888

(22) Filed: Dec. 21, 2010

(65) Prior Publication Data

US 2011/0174050 A1    Jul. 21, 2011

(30) Foreign Application Priority Data

Jan. 18, 2010    (ES) .................................. 201030044

(51) Int. Cl.
     *G01L 27/00*      (2006.01)
     *G01P 5/16*      (2006.01)

(52) U.S. Cl.
     USPC .......................................... 73/1.79; 73/866.5

(58) Field of Classification Search
     USPC ................................. 73/866.5, 1.79
     See application file for complete search history.

(56) References Cited

U.S. PATENT DOCUMENTS

| | | | | |
|---|---|---|---|---|
| 2,554,634 A | * | 5/1951 | Paine et al. | 73/861.65 |
| 2,662,402 A | * | 12/1953 | Ince, Jr. et al. | 73/180 |
| 2,850,896 A | * | 9/1958 | Se Legue et al. | 73/170.02 |
| 3,019,643 A | * | 2/1962 | Curry | 73/147 |
| 3,170,324 A | * | 2/1965 | Ritchie et al. | 73/861.65 |
| 3,482,445 A | * | 12/1969 | Hagen et al. | 73/182 |
| 3,587,306 A | * | 6/1971 | Bryan | 73/147 |
| 3,670,569 A | * | 6/1972 | Partzsch | 73/180 |
| 3,696,673 A | * | 10/1972 | Ribner et al. | 73/861.74 |
| 3,977,249 A | * | 8/1976 | Wittig | 73/861.67 |
| 4,000,647 A | * | 1/1977 | Tauchmann | 73/181 |
| 4,096,744 A | * | 6/1978 | De Leo et al. | 73/180 |
| 4,184,149 A | * | 1/1980 | Baker et al. | 340/870.11 |
| 4,275,603 A | * | 6/1981 | Kalocsay | 73/861.68 |
| 4,378,696 A | * | 4/1983 | DeLeo et al. | 73/180 |
| 4,428,549 A | * | 1/1984 | Halliday et al. | 244/1 R |
| 4,804,154 A | * | 2/1989 | Davis | 244/1 R |
| 4,938,058 A | * | 7/1990 | Girard | 73/147 |
| 4,938,059 A | * | 7/1990 | Faucher et al. | 73/147 |
| 5,046,360 A | * | 9/1991 | Hedberg | 73/182 |
| 5,130,707 A | * | 7/1992 | Hagen | 340/945 |
| 5,337,602 A | * | 8/1994 | Gibson | 73/182 |
| 5,369,993 A | * | 12/1994 | Hagan | 73/178 R |
| 5,663,497 A | * | 9/1997 | Mole | 73/147 |
| 6,419,186 B1 | * | 7/2002 | Bachinski et al. | 244/17.11 |
| 6,452,542 B1 | * | 9/2002 | Bachinski et al. | 342/357.75 |

(Continued)

FOREIGN PATENT DOCUMENTS

WO    WO 0032470 A1 * 6/2000

*Primary Examiner* — David A Rogers
(74) *Attorney, Agent, or Firm* — Paul Bogdon

(57) ABSTRACT

Support device (1) for probe (2) to measure the physical characteristics of air in contact with an aerodynamic surface (3) comprises: a rod (9) affixed to a probe (2) to distance probe (2) from an aerodynamic surface (3) such that probe (2) measures the air undisturbed by the aerodynamic surface (3); a support (4) adapted to be affixed to the aerodynamic surface (3) to which the foregoing rod (9) is connected such that support (4) permits rotation of rod (9) about the principal axis (12) of probe (9) to calibrate the position of probe (2) and such that the rotation of rod (9) may be locked once the position of probe (2) has been calibrated. An aerodynamic surface (3) comprising device (1), and a method for the calibration of probe (2) to measure the physical characteristics of the air in contact with an aerodynamic surface (3) are also disclosed.

12 Claims, 4 Drawing Sheets

(56) References Cited

U.S. PATENT DOCUMENTS

| | | | |
|---|---|---|---|
| 6,557,243 B2 * | 5/2003 | Feeley et al. | 29/611 |
| 6,622,390 B2 * | 9/2003 | Brusius | 33/286 |
| 7,137,297 B2 * | 11/2006 | Giterman | 73/170.02 |
| 7,597,018 B2 * | 10/2009 | Braun et al. | 73/866.5 |
| 8,256,284 B2 * | 9/2012 | Vozhdaev et al. | 73/170.02 |
| 2002/0157229 A1 * | 10/2002 | Feeley et al. | 29/402.08 |
| 2002/0166375 A1 * | 11/2002 | Cronin et al. | 73/170.02 |
| 2003/0010130 A1 * | 1/2003 | Bachinski | 73/747 |
| 2004/0093953 A1 * | 5/2004 | Gilkison et al. | 73/736 |
| 2004/0193333 A1 * | 9/2004 | Tschepen et al. | 701/7 |
| 2004/0261518 A1 * | 12/2004 | Seidel et al. | 73/182 |
| 2005/0232332 A1 * | 10/2005 | Hanson et al. | 374/141 |
| 2009/0064803 A1 * | 3/2009 | Pettit et al. | 73/866.5 |
| 2010/0064766 A1 * | 3/2010 | Nugent et al. | 73/1.16 |

* cited by examiner

SUPPORT DEVICE FOR PROBE

FIELD OF THE INVENTION

The present invention relates to a support device for a probe, in particular for a probe for the measurement of physical characteristics of the air in contact with an aerodynamic surface on which the aforementioned probe is disposed. The invention furthermore relates to a method for realising the calibration of a probe for the measurement of physical characteristics of the air in contact with an aerodynamic surface, together with a method for the measurement of the physical characteristics of the air in contact with the aerodynamic surface.

BACKGROUND

Aeronautical surfaces, in particular the surfaces lifting an aircraft during the flight thereof, are influenced in their behaviour by the physical characteristics of the air in contact with the aforementioned surface. One of the physical characteristics of greater importance is the angle of attack.

In the aeronautical field the angle of attack is the angle formed by the geometric chord of the cross-section of an aerodynamic surface with respect to the direction of the incident air. The angle of attack is a parameter decisively influencing the capacity to generate lift of the aforementioned aerodynamic surface. In general on increasing the angle of attack the lift of the surface increases until a certain point at which lift decreases sharply, a phenomenon known as stalling.

As a consequence it is of great importance in the aerodynamic field, and particularly during the phase of development and/or design, to measure the actual angle of attack of the stream of air incident upon an aerodynamic surface, in particular on a lifting surface such as wings, stabilisers and others, to be able to certify aerodynamic models realised beforehand by numerical methods and/or tunnel tests.

In this respect it becomes necessary to install on aerodynamic surfaces, and in particular on surfaces lifting an aircraft, a device to support probes to measure the angle of attack (also known as angle of incidence). By virtue of this device probes may realise the measurement of the angle of attack such that they are undisturbed by the lifting surface whereon they are disposed. Moreover the aforementioned probes require to be installed and calibrated on the foregoing device, utilising as reference independent elements of the aircraft to obviate the various tolerances which may accumulate on the different surfaces.

Devices to measure the angle of attack are known, for example from the documents U.S. Pat. No. 4,230,290, U.S. Pat. No. 2,237,306 and U.S. Pat. No. 2,855,779, in particular probes to measure the angle of attack of an aerodynamic surface, together with methods for designing such devices. The measurement probes of these documents are disturbed by the stream incident on the aerodynamic surface as a result of which they do not provide a real measurement of the angle of attack. Furthermore the calibration of these probes is not realised in an appropriate and reliable manner. Moreover the foregoing documents describe probes to measure the angle of attack of an aerodynamic surface; however they are not orientated toward a support device for the probes in compliance with the aforesaid requirements.

The present invention is orientated toward the achievement of the aforementioned objectives.

SUMMARY OF THE INVENTION

Consequently, according to a first aspect the present invention relates to a support device for a probe for the measurement of physical characteristics of the air in contact with an aerodynamic surface, such as the angle of attack or incidence. The support device of the invention permits the probe to realise a real undisturbed measurement of the physical characteristics of the air; this device moreover permitting calibration of the probe, utilising as reference independent elements of the aircraft such that the calibration is reliable and appropriate. In this manner this device permits calibrating the probes with respect to an external reference such as not to introduce in the measurement chain all the defects, tolerances, adjustments, etc, flowing from the industrial processes of the aircraft in question.

In this manner the invention relates to a support device for a probe for the measurement of physical characteristics of the air in contact with an aerodynamic surface, comprising:

a rod to which is affixed the probe to distance the probe from the aerodynamic surface such that the probe measures air undisturbed by the aerodynamic surface; and a suitable support to be affixed to the aerodynamic surface to which the foregoing rod is connected, such that the support permits rotation of the rod about the axis of the rod to calibrate the position of the probe and such that rotation of the rod may be locked once the position of the probe has been calibrated.

In the foregoing device the probe is affixed to the rod by means of an interchangeable part such that the rod may be used with probes having differing geometries and dimensions. This interchangeable part comprises a grommet permitting connection by cables of the probe with the rod and the support; this piece moreover being adapted such that, disposed in use affixing the probe to the rod, it prevents introduction of water or other elements both into the probe and into the rod. Moreover both the rod and the support are adapted to prevent ingress of water or other elements into the support device of the invention.

Furthermore in the device of the invention the rod may be installed on different surfaces of the aircraft, such as wings, vertical stabilisers or horizontal stabilisers.

The objective of the present invention is consequently to provide a support device for probes to measure the characteristics of the stream for use principally during the phases of flight trials and, preferably, in those zones of an aircraft wherein it is of maximum importance to know the physical characteristics of the air in relation to the surface in question.

Consequently the support device for a measurement probe of the invention comprises:

a) a support adapted to the geometry of the aerodynamic surface whereon it is supported and the aerodynamic characteristics whereof it is desired to measure, this support comprising an access permitting installation of the cabling required for the probe;
b) a rod to which the probe is affixed;
c) a posterior closure device whereon is seated the rear part of the rod permitting it to retain the aerodynamic characteristics thereof, and
d) an interchangeable part permitting the rod to be used with probes having different geometries and dimensions.

According to a second aspect, the invention relates to an aerodynamic surface comprising a support device for a probe for the measurement of physical characteristics of the air in contact with the surface, such as the angle of attack or incidence, as has been described.

Furthermore, according to a third aspect, the invention moreover relates to a method of realising the calibration of a probe for the measurement of physical characteristics of the air in contact with an aerodynamic surface, such as the angle of attack or incidence.

Finally, according to a fourth aspect, the invention relates to a method for the measurement of the angle of attack or incidence of an aerodynamic surface.

Other characteristics and advantages of the present invention will emerge from the detailed description below in relation to the figures attached.

DETAILED DESCRIPTION OF THE INVENTION

Figure 1:
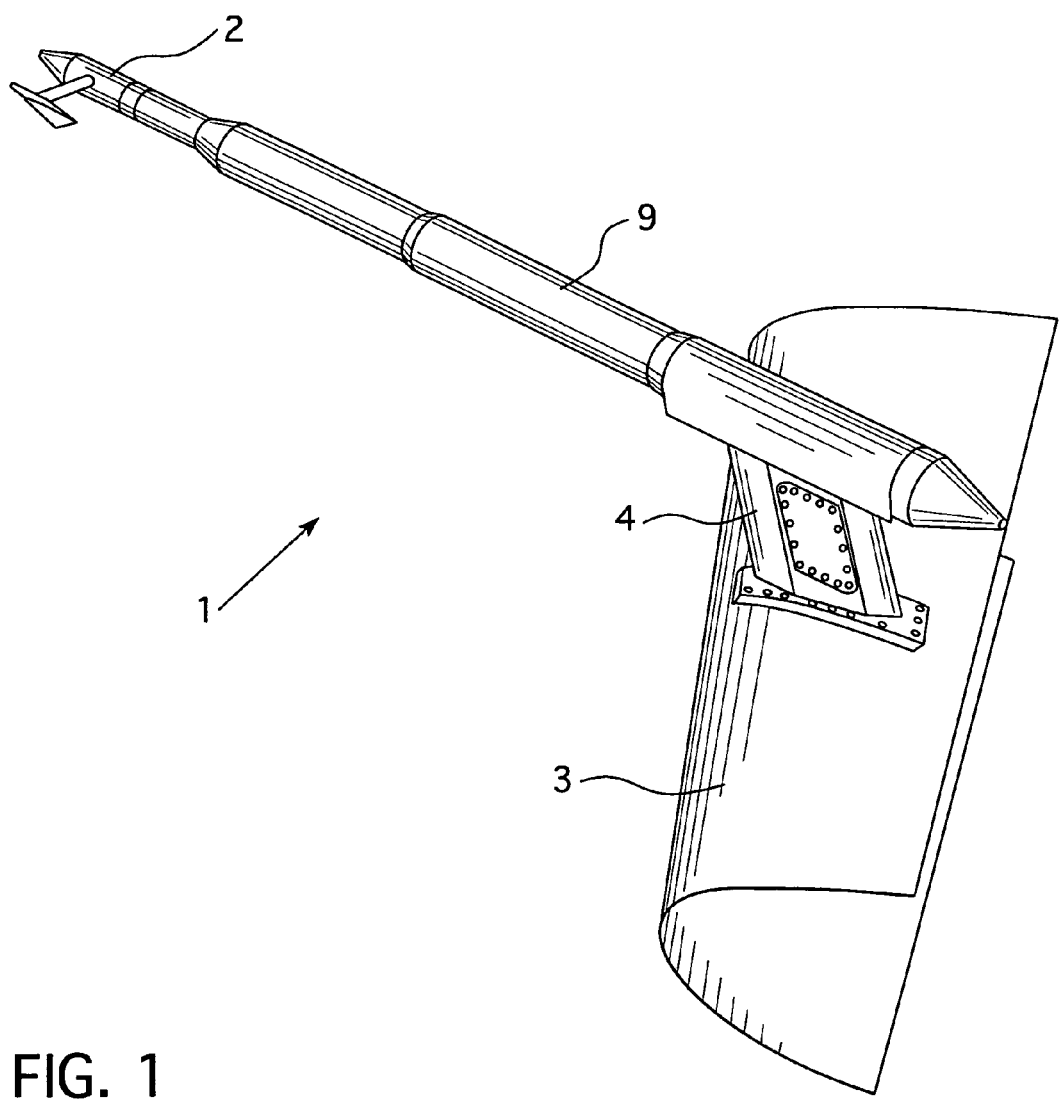
FIG. 1 shows an overall view of the support device for a measurement probe according to the invention.

Consequently the support device 1 for a probe 2 to measure physical characteristics of the air in contact with an aerodynamic surface 3 comprises the following elements:
a) a mount 4 adapted to the geometric conditions of the surface 3 whereon it is supported, the aerodynamic characteristics whereof it is desired to measure, the mount 4 being structurally robust to withstand the stresses to which it may be subjected in the use thereof, the mount 4 comprising access 5 permitting the appropriate installation of the cabling required for probe 2;
b) a posterior closure device 6 comprising: a stop 8 whereon is seated the rear part of a rod 9, being tightened preferably by a threaded rod, and a posterior cover 10 maintaining the required aerodynamic characteristics of the support device 1 in its rear part, preferably screwed onto stop 8;
c) a protective seal 19 disposed between the mount 4 and the rear closure device 6;
d) a rod 9 whereto is joined the probe 2 such that the rod 9 is joined to the mount 4 such that rotation thereof about its principal axis 12 is permitted in order that in probe 2 a horizontal plane may be obtained independent of the conditions of aerodynamic surface 3 on which the entire device 1 is seated;
e) an interchangeable part 7, located at the forward part of rod 9, comprising grommet 13 permitting connection through cables of the probe 2 to the rod 9 and the mount 4, this part 7 moreover being adapted such that, disposed in use affixing the probe 2 to the rod 9, it prevents the introduction of water or other elements both into the probe 2 and into the rod 9, and
f) a forward stop 17 situated between the rod 9 and the probe 2.

In the foregoing device 1 both the rod 9 and the mount 4 are adapted to prevent ingress of water or other elements into the device 1.

Rod 9 may comprise one or several parts 14, preferably in the form of tubes joined by methods customary in the aeronautical industry. Rod 9, by means of interchangeable part 7, permits through an adapter part 15, adaptation between the diameters of the tubes 14 forming rod 9 and the diameter of the probe 2 which in general will differ, the rod 9 having structural requirements which the probe 2 does not.

Interchangeable part 7 additionally houses an electrical connector 16 necessary for the connection of the probe 2.

Figure 2:
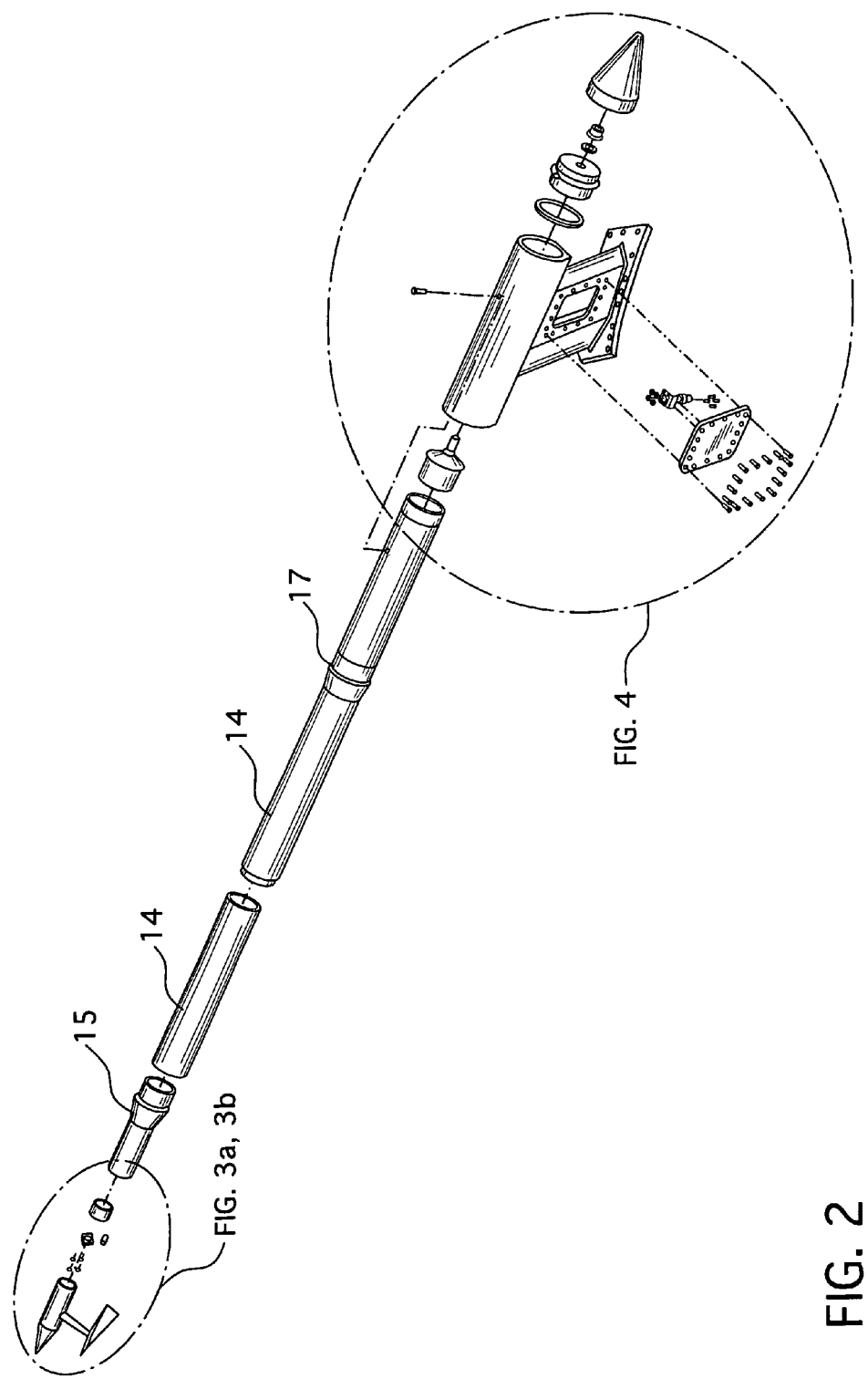
FIG. 2 shows the principal elements comprising a support device for a measurement probe according to the invention.

In FIG. 2 the different components of the rod may be observed, specifically the front stop 17 which, together with the stop 8 of the posterior closure device 6, retains rod 9 in place, together with the different tubes 14 or sections of rod 9.

Figure 4:
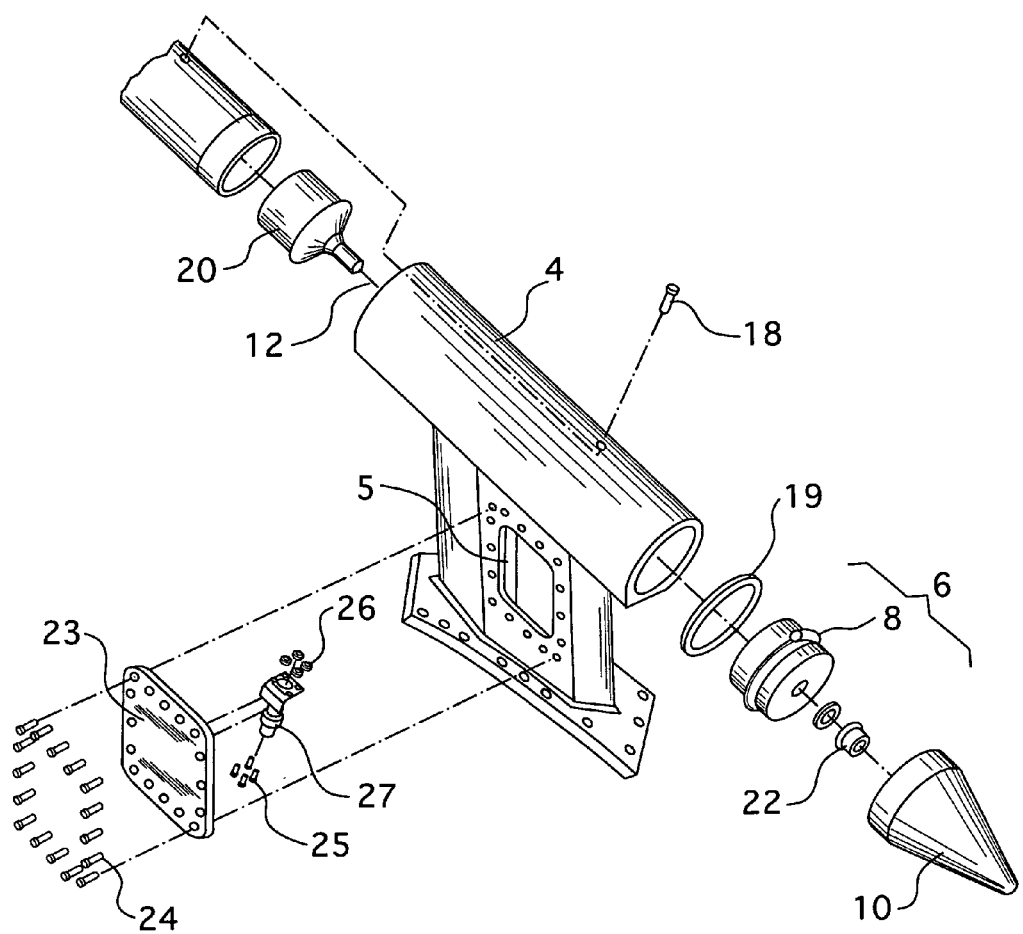
FIG. 4 shows in detail the mount of the support device for a measurement probe according to the invention.

In FIG. 4 bolt 18 may be observed securing the desired angular position of rod 9 and consequently of probe 2.

Device 1 of the invention is joined by means of the mount 4 to the surface 3, preferably by means of bolts. Rod 9 is situated longitudinally with respect to the mount 4 by means of the posterior closure device 6, secured by nut 22, and forward stop 17, being free in its sense of rotation about its longitudinal axis 12 until being immobilised and secured in a position determined by bolt 18. With the objective of not damaging the mount 4 the posterior closure device 6 comprises a seal 19.

Rod 9 comprises preferably tubes 14, the forward stop 17, the adapter 15, the interchangeable part 7 and a bush 20. Nevertheless rod 9 may be formed by as many elements as considered necessary as a function of the total overall length thereof, determined by the estimated characteristics of the disturbance produced by the stream incident on the surface 3 and the required structural characteristics of strength and rigidity thereof, in addition to restrictions imposed by the materials and the manufacture of elements of this type (tubes, machining, etc).

Figure 3A:
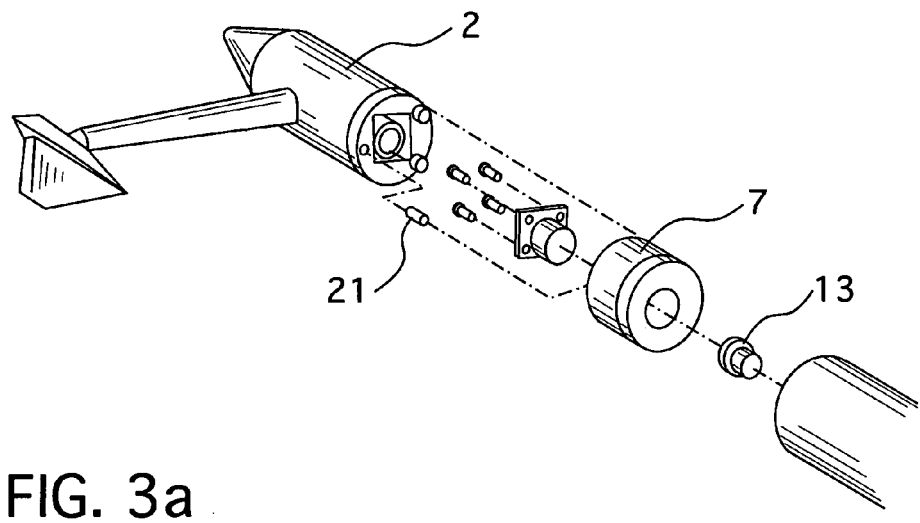
FIGS. 3a and 3b show in detail the join between a probe and the rod to the support device for a measurement probe according to the invention.
Figure 3B:
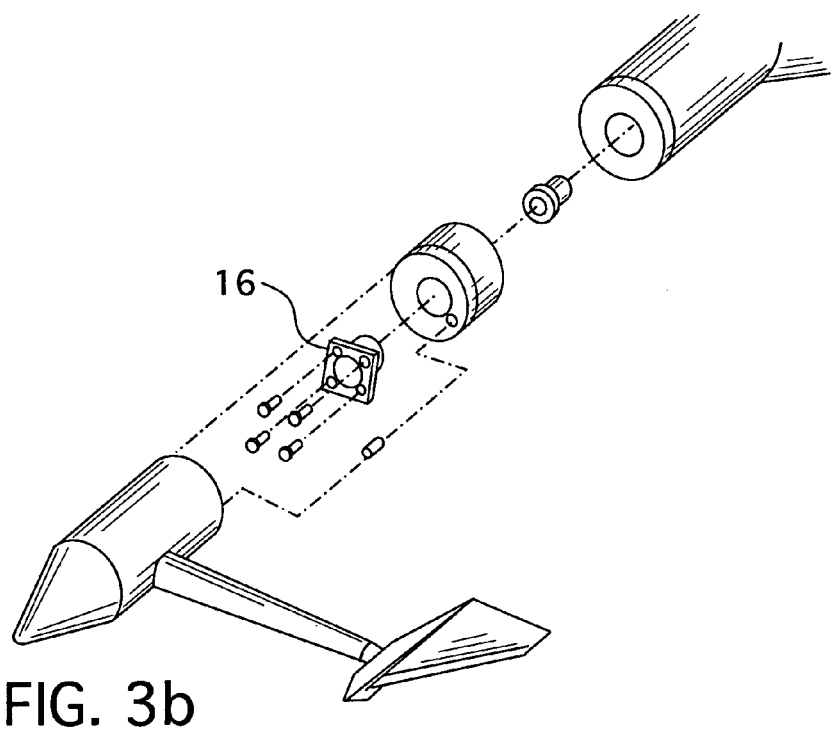

As is observed in FIG. 3 installation of the probe 2 on the rod 9 is realised by means of the interchangeable part 7 to which it is joined by fixing a device 21 which may be an anti-rotation element such as, for example, a bolt, a pin or an anti-rotation stud, to prevent rotation of the probe 2 about the principal longitudinal axis 12 of rod 9.

Device 1 permits installation of the electrical system of probe 2 wherefore the mount 4 comprises the access 5 closed by a cover 23 affixed by means of bolts 24. Access 5 consequently permits access and connection of the cabling of the device 1 to the general electrical system of the aircraft. This connection is produced in a connector 27 affixed to the cover 23 by the mount 4 whereto it is joined by bolts 25 and nuts 26.

Device 1 may be utilised with an electrical probe 2 or any other measurement system, it being simply necessary to slightly modify device 1 in the coupling thereof to probe 2 or to the measurement system required.

A method for the calibration of probe 2 to measure the physical characteristics of the air in contact with an aerodynamic surface 3, such probe 2 being disposed on aerodynamic surface 3 by a support device 1 such as that referred to below, comprises the following steps:
a) rod 9 is initially formed of the aforementioned elements together with the internal cabling thereof;
b) the complete rod 9 is subsequently introduced into mount 4 through its anterior (forward) part, at the same time at its posterior part there being installed posterior closure device 6, preferably with seal 19, being affixed without tightening nut 22 on the threaded zone of bush 20;
c) the entire, rod 9 is then rotated about its longitudinal axis 12 until the desired horizontal calibration reference, external to the entire device 1;
d) bolt 18 is installed and affixed and final tightening of nut 22 is realised to subsequently install posterior cover 10;
e) electric connection is realised through access 5, opened through the mount 4, by bolts 25 and nuts 26, these being preferably affixed to cover 23, although they may be affixed to mount 4 or to another element, and
f) cover 23 is affixed to mount 4 by bolts 24.

Employing the foregoing calibration method to probe 2 is calibrated on support device 1 such that the longitudinal axis 12 of rod 9 is made to coincide with an external horizontal axis of reference, independent of the conditions of aerodynamic surface 3 whereon the entire device 1 is seated, such as to obviate the different tolerances which may accumulate in the different surfaces taken as a reference.

The invention furthermore relates to a method for realising the measurement of the angle of attack of the air with respect to the aerodynamic surface 3 whereon it is incident by the probe 2 disposed on aforementioned aerodynamic surface 3 by the support device 1 such as that aforementioned. The foregoing method comprises the following stages or steps:

a) calibration of the probe 2 on the support device 1 disposed on the aerodynamic surface 3 by the aforementioned method;

b) measurement of the angle formed by the stream of air incident on the aerodynamic surface 3 with respect to the longitudinal reference axis 12 of the rod 9 with the probe 2, which has been made to coincide with an external horizontal axis of reference, independent of the conditions of the aerodynamic surface 3 whereon is seated the entire device 1, such measurement yielding the angle of attack of the incident stream with respect to the surface 3, this measurement being directly related with the lift from the surface 3.

By virtue of this method the probe 2 may realise the measurement of the angle of attack of the surface 3 such that such measurement is undisturbed by the surface 3 upon which the probe 2 is disposed.

Although the present invention has been entirely described in connection with preferred embodiments, it is clear that modifications can be introduced within the scope of the following claims, not considering such scope to be limited by the foregoing embodiments.

The invention claimed is:

1. A support device assembly (1) for a probe (2) for measuring the physical characteristics such as angle of attack of the air in contact with an aerodynamic surface (3), characterized in that the support device assembly comprises:
   (a) an elongated rod assembly (9) for supporting the probe (2) such that the probe (2) is distanced from the aerodynamic surface (3) whereby the probe (2) measures the air undisturbed by the physical conditions of the aerodynamic surface (3);
   an upright support means (4) constructed to be singly affixed to the aerodynamic surface (3) for supporting the rod assembly (9) above the aerodynamic surface (3) for rotation of the rod assembly (9) about its principal longitudinal axis (12) for calibrating the position of the probe (2); and
   locking means for selectively locking the rod assembly (9) once the position of the probe (2) has been calibrated.

2. The support device assembly (1) according to claim 1 where the probe (2) is affixed to the rod assembly (9) by means of an interchangeable part (7) such that the rod assembly (9) may be used with at least two probes (2) having different geometries and dimensions.

3. The support assembly device (1) according to claim 2 wherein the interchangeable part (7) comprises a grommet (13) permitting connection by at least one cable of the probe (2) to the rod assembly (9) and the support means.

4. The support assembly device (1) according to claim 2 wherein the interchangeable part (7) is adapted such that, disposed in use affixing the probe (2) to the rod assembly (9) the interchangeable part (7) prevents the introduction of water or other elements into the probe (2) and into the rod assembly (9).

5. The support assembly device (1) according to claim 2 wherein the rod assembly (9) comprises at least one joined part (14) adapted to the diameter of the probe (2) by means of the interchangeable part (7).

6. The support assembly device (1) according to claim 1 wherein the rod assembly (9) and the support means (4) are adapted to prevent the ingress of water or other elements into the device (1).

7. The support assembly device (1) according to claim 1 further comprising a bolt (18) and wherein the rotation of the rod assembly (9) is locked once the position of the probe (2) has been calibrated by means of the bolt (18) securing the angular position of the probe (2).

8. The support assembly device (1) according to claim 1 further comprising a fixing device (21) and wherein the installation of the probe (2) on the rod assembly (9) is realized by means of the fixing device (21) preventing rotation of the probe (2) about the principal longitudinal axis (12) of the road assembly (9).

9. A method for the calibration of a probe (2) to measure the physical characteristics of the air in contact with an aerodynamic surface (3), the probe (2) being disposed upon the aerodynamic surface (3) by a support device assembly (1) according to claim 1, comprising;
   a) connecting elongated rod assembly (9) to support means (4) through the forward part of rod assembly (9), there being installed at the same time at its posterior part a closure device (6) permitting the rotation of the rod assembly (9) about its principal longitudinal axis (12);
   b) rotating rod assembly (9) about its longitudinal axis (12) until principal longitudinal axis (12) until the probe (2) is at a desired calibration position independent of the conditions of the aerodynamic surface (3) whereon support device assembly (1) is seated; and
   c) locking the rotation of rod assembly (9) by a closure device (6) once the position of probe (2) has been calibrated.

10. The method according to claim 9 wherein in step a) the rotation of rod assembly (9) is permitted about its principal longitudinal axis (12) by means of a nut (22) disposed in a loose manner on a threaded zone of a bush (20).

11. The method according to claim 10 wherein in step c) the rotation of rod assembly (9) is locked by means of a bolt (18) of the closure device (6), furthermore realizing the final tightening of the nut (22) on the bush (20).

12. The method according to claim 9 further comprising:
   d) realizing the measurement of the angle formed by the stream air incident on the aerodynamic surface (3) with respect to the principal longitudinal reference axis (23) of the rod (9) with the probe (2), this measurement yielding the angle of attack of the incident stream with respect to the aerodynamic surface (3).

* * * * *